No. 790,581. PATENTED MAY 23, 1905.
D. R. LOVEJOY.
INDUCTANCE AND INDUCTION COIL FOR ELECTRICAL APPARATUS.
APPLICATION FILED AUG. 19, 1903.
3 SHEETS—SHEET 2.
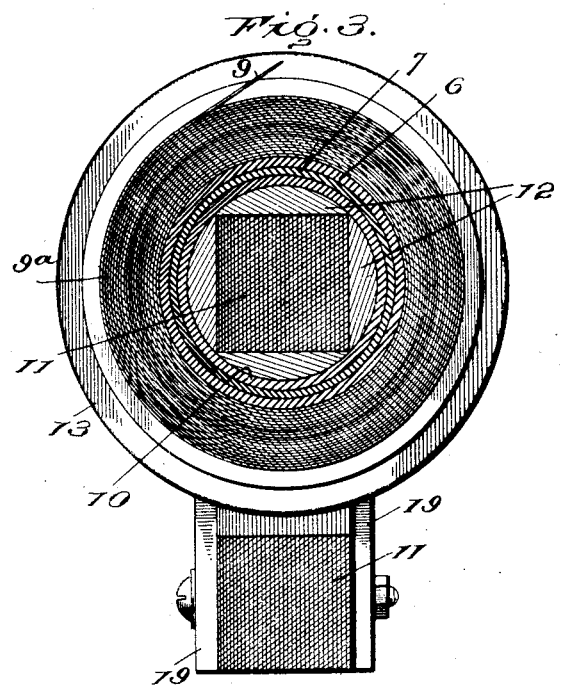
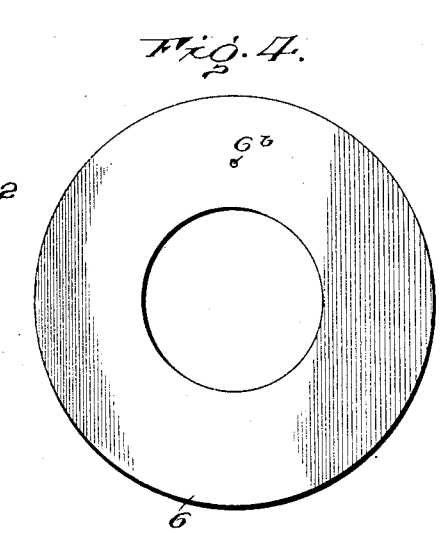
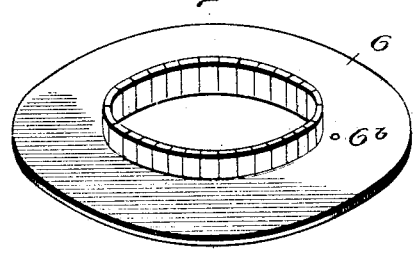
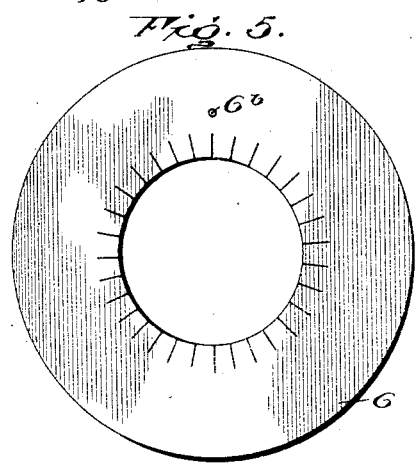
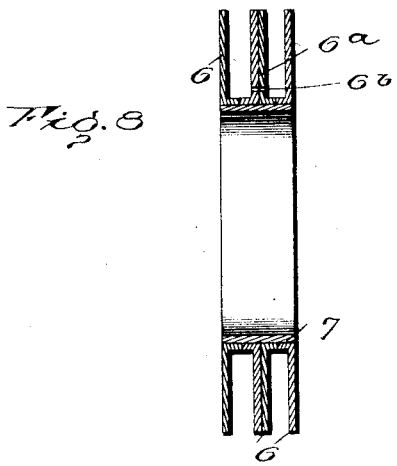
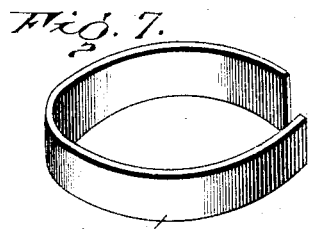
Witnesses:
H. C. Workman
M. A. Witherell
Inventor
D. R. Lovejoy
By his Attorneys
Knight Bros.

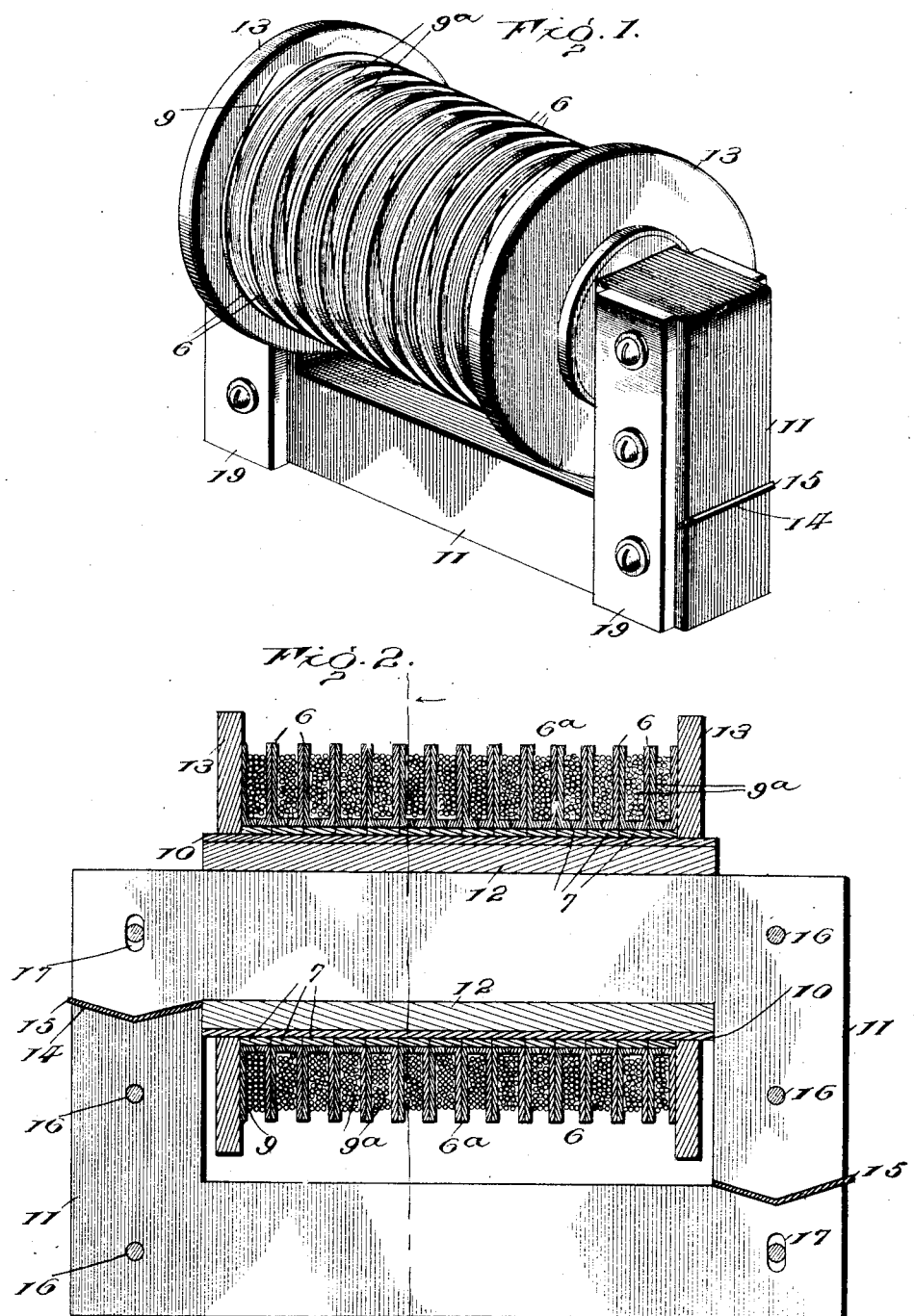

No. 790,581. PATENTED MAY 23, 1905.
D. R. LOVEJOY.
INDUCTANCE AND INDUCTION COIL FOR ELECTRICAL APPARATUS.
APPLICATION FILED AUG. 19, 1903.
3 SHEETS—SHEET 3.
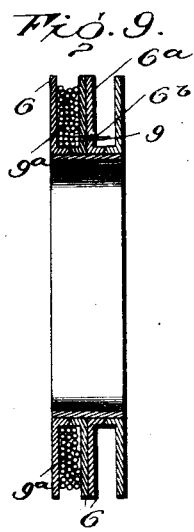
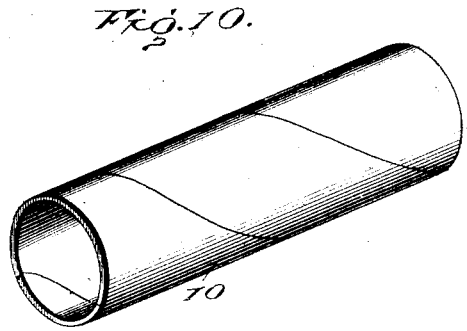
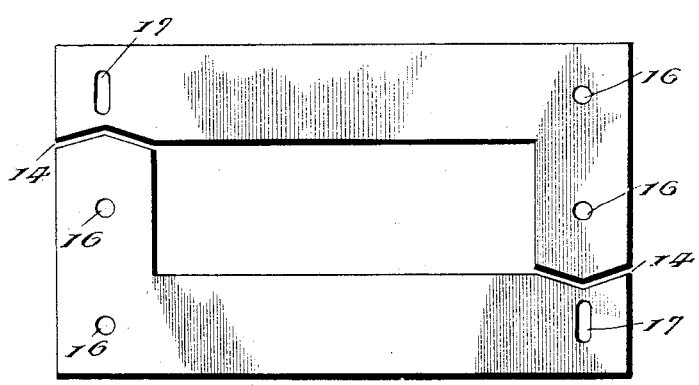
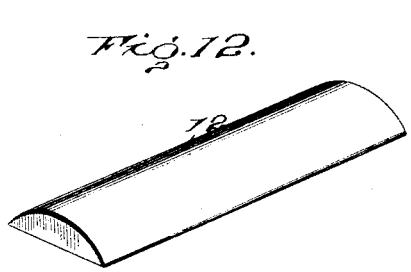
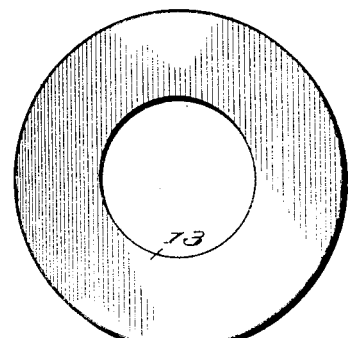
Witnesses:
H. C. Workman
M. A. Witherell
Inventor
D. R. Lovejoy
By his Attorneys
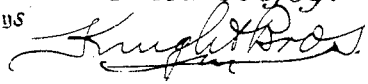

No. 790,581.

Patented May 23, 1905.

UNITED STATES PATENT OFFICE.

DIMMITT ROSS LOVEJOY, OF NIAGARA FALLS, NEW YORK, ASSIGNOR TO ATMOSPHERIC PRODUCTS COMPANY, OF NIAGARA FALLS, NEW YORK, A CORPORATION OF NEW YORK.

INDUCTANCE AND INDUCTION COIL FOR ELECTRICAL APPARATUS.

SPECIFICATION forming part of Letters Patent No. 790,581, dated May 23, 1905.

Application filed August 19, 1903. Serial No. 170,061.

*To all whom it may concern:*

Be it known that I, DIMMITT ROSS LOVEJOY, a citizen of the United States, residing at Niagara Falls, in the county of Niagara and State of New York, have invented certain new and useful Improvements in Inductance and Induction Coils for Electrical Apparatus, of which the following is a specification.

This invention relates to improvements in methods of winding and insulating coils, especially of coils for transformers or inductances, and of adjusting the coefficient of self-induction in inductance or "choking" coils, whereby high insulation and ease of adjustment are obtained, together with cheapness of construction.

Heretofore when coils have been required to withstand high electromotive forces—as, for instance, the secondary windings of induction-coils—resort to so-called "pancake-windings" has been customary, and such form of winding is well known and has been employed for many years. There are certain difficulties in the formation of such windings, however. For instance, in the best method of construction heretofore used the several individual pancakes are wound on metal or wooden forms and with insulated wire which is run through a bath of hot wax, or hot wax is poured over the finished coil when wound on the metal or wooden form, and the said wax being allowed to cool serves to retain the pancake in shape, so that it may be handled and removed from the winding-form when cold. The several pancakes are then assembled on a tube of insulating material, usually glass or hard rubber, and connected together, each alternate coil being put on in a reverse direction and the inner ends joined together and the outer ends of the wire on each pancake likewise joined each to its neighbor, so as to connect them all in series, and so form a complete winding of the several pancakes, insulating-disks being interposed between each pancake and its neighbor on each side. This method of winding and assembling the several pancakes to form a complete winding (while the best in use) is tedious, difficult to carry out satisfactorily, and expensive. The present application discloses a much simpler and cheaper method of forming and assembling such pancake-windings. To this end I prefer to wind the insulated wire dry instead of passing it through melted wax, and in order that the pancake may retain its shape and be easily and safely handled I provide a spool or form on which to wind the dry wire and on which it remains. In order to obviate the difficulty of properly connecting the inside ends of such coils together, I prefer to make the spool or form of double or twin construction, winding each side of said spool in opposite directions, the pair of pancakes thus connected forming one unit in which the winding has two outside ends and no inside ends, and then assembling such pairs or units into complete windings. In order to cheapen the cost of such double spools, I prefer to make them of strawboard or pasteboard or analogous material and form them into shape by means of dies.

The accompanying drawings represent a choke-coil or inductance-coil in which my invention has been embodied in practical use, and in detail the parts of which such coil is made up.

Figure 1 is a perspective view of the said inductance-coil. Fig. 2 is a longitudinal section of the same. Fig. 3 is a transverse section thereof. Figs. 4 to 13, inclusive, are detail views hereinafter specifically referred to of the separate parts of which the said coil is constructed, Figs. 4, 5, and 6 showing in progressive stages of manipulation annular disks of pasteboard or like material of which the twin winding-spools are formed, and Fig. 7 a strip of same material, which is sprung inside each pair of twin spools to connect the same. Fig. 8 is a longitudinal section of a pair of twin spools connected and ready for winding. Fig. 9 is a similar view showing the twin spools one-half wound. Fig. 10 represents a tube of strawboard or like cheap insulating material, (which is boiled in melted wax or oil,) on which any desired number of the twin spools are assembled after winding. Fig. 11 represents a pair of L-shaped plates of thin sheet-iron, a number of which are used to form the laminæ of which the two parts of the magnet-core are made up. Fig. 12 is a detail view of a segmental block of wood or other non-conducting material, four of which are used to fill the spaces between the square core and the tube surrounding it. Fig. 13 represents an annular disk of larger diameter, a number of which are used to form each end or head of the completed coil.

In the practical construction of induction-coils according to my invention I have proceeded as follows: I stamp from sheets of strawboard or pasteboard or analogous material annular disks, such as shown in Fig. 4. These rings are then notched around the inside edge by means of a many-edged punch, as in Fig. 5. The rings are then put into a bath of melted wax or other suitable melted compound, which is nearly or quite solid at ordinary temperature, and allowed to remain in said hot bath until all air and moisture have been driven therefrom in the form of bubbles and the pores are completely filled with the melted compound. The rings are then lifted from the bath, allowed to drain a moment, and then placed between dies adapted to upset the notched inner edge in the form of an approximately cylindrical flange. These dies are cooled preferably by cold-water circulation in each, so as to hasten the cooling and setting of the melted compound in the pores of the strawboard. The dies are pressed together with considerable force, so as to squeeze out any surplus wax. As soon as cool (which is very quickly accomplished in water-cooled dies) the disk is removed and its upturned edge trimmed off to proper length, as shown in Fig. 6. In practice the form shown in Fig. 6 may be produced without trimming by proper forming of the blank originally. Four such disks or pressed rings 6 are then assembled, as shown in Fig. 8, and held together by a strip of pasteboard 7 cut to proper width and length and sprung inside the formed and assembled rings. Lastly, the whole structure thus formed is preferably bound together by a little melted wax. This twin unit is now placed in a metal form mounted on a shaft, so as to be rapidly revolved, a hole 6$^b$ is punched through its middle partition 6$^a$, formed by the inside pair of disks and close to the bottom of the annular spaces, the end of the wire 9 is passed through this hole, and one of the pancakes wound full, as shown in Fig. 9, the wire 9$^a$ being not put on in exact layers, but only approximately level during the course of the winding. When one side is wound full, the twin spool is taken off the metal form and put back in a reversed position. The wire is spliced to the inside end of the already-wound pancake, the said inside end having been left long enough to be readily accessible, and the winding continued until the second half of the twin spool has been filled, thus completing the unit, (9.) As many of these twin units may be assembled into a complete coil as desired, no regard to the direction in which they are assembled being necessary, since they are symmetrical, and the winding is in the same direction with respect to either side, the outside ends being simply connected together across the pasteboard barriers, so as to form a continuous coil. It may be pointed out that the elimination of inside ends in the assembling is very desirable, not only on account of the extreme difficulty of connecting such inside ends together during the process of assembling on account of their inaccessibility when the pancakes are formed singly, but because such inside ends are very liable to be broken off, especially with the finer sizes of wire, and when this occurs the pancake is rendered useless. It is obvious that should an outside end be broken off it is merely necessary to unwind one turn of wire to secure a new end for connection and the pancake is uninjured.

As stated before, pancake-windings have hitherto been assembled on tubes of hard rubber or glass or such high insulating and correspondingly expensive material, and it is the purpose of this specification to show how such expensive mounting for the pancake-windings may be dispensed with. To this end I prefer to assemble the twin pancake on a tube 10, of strawboard, which has been boiled in melted wax or oil to drive out moisture and air, and the said strawboard tube in turn surrounds the iron core of the transformer or induction coil with segmental pieces 12 of dry wood or similar suitable material interposed between the core 11 and the tube 10. This provides a blocking or filling between the square core 11, which is almost invariably used in modern electrical apparatus, (as that form is best adapted to be built up from plates of laminæ or iron,) and the circular tube 10, the said blocking also furnishing an additional insulator between the windings and the iron core 11. Lastly, heads or flanges 13, formed of thick cardboard and snugly fitting the strawboard tube 10, are forced over the ends of the same to confine the pancakes to their proper position.

In order that the magnetic reluctance of the iron circuit of choking coils or transformers may be changed or adjusted, I provide one or more gaps 14 in said circuit, with means for varying the length of such air-gaps by the interposition of paper or cardboard or wedges 15 of any suitable material interposed in the said gap, so as to afford a ready means for varying the said gap and so altering the magnetic reluctance of the iron core or magnetic circuit, and thereby altering the coefficient of self-induction of the windings on said core.

In the case of the choking-coils herein described I prefer to have the magnetic core 11 in two symmetrical parts or sets of punchings, as shown in Fig. 12, these punchings being adapted to fit into each other, so as to form a complete rectangular magnetic circuit having two air-gaps formed where the punchings are joined. The junctures I prefer to have in the form of counterpart V's, as shown, in order that there may be no tendency for the two sets of punchings to slip upon each other and, further, in order that cardboard or paper or interposing wedges in the air-gaps may be more firmly held in position. The iron punchings are provided each with two round holes 16 and one elliptical hole or slot 17, and these holes are adapted to receive bolts 18, which serve to bind the whole core together, the slots permitting motion of the two parts relative to each other and the necessary adjustment of the air-gaps. Pieces 19, of hardwood or other suitable material, provided with holes similar to the holes in the iron punchings 11 and through which the binding-bolts 18 pass, complete the structure.

Having thus described my invention, the following is what I claim as new therein and desire to secure by Letters Patent:

1. A coil of the character described, said coil made up of a series of pancake-windings, each of said windings being upon a separate spool, said windings being connected to form a continuous coil.

2. Spools for pancake-windings formed together in pairs, each pair constituting a unit, substantially as described.

3. Spools for pancake-windings, consisting of strawboard or similar material, pressed into shape by dies and assembled in twin units, substantially as set forth.

4. A unit for coil construction, said unit consisting of a pair of separate pancake-windings, said windings having their ends near the core connected or spliced together and their ends near the periphery loose or free for connection with the windings of adjacent units, the two windings of each unit thereby forming a continuous coil.

5. In "choking" coils for electrical circuits, a winding composed of twin pancakes and a core made up of two parts and having an adjustable gap, substantially as described.

6. In "choking" coils for electrical circuits, a winding composed of twin pancakes and a core made up of two parts and having a plurality of adjustable gaps, substantially as described.

7. In "choking" coils for electrical circuits, a winding composed of twin pancakes and a core made up of two parts and having an adjustable gap, in combination with a body or wedge interposed to maintain said gap, substantially as described.

8. A support for coil-windings, said support consisting of a plurality of twin spools, each twin or pair of spools mounted upon a sleeve, a tube for supporting a plurality of said twins or pairs, said spools, sleeve and tube being formed of fibrous material thoroughly saturated with wax or similar material.

9. A coil of the character described, said coil made up of a plurality of units, each unit comprising a twin spool, and pancake-windings upon each member of said spools, said windings being connected together near the core and having the peripheral ends connected to the windings of adjacent spools whereby the entire coil-winding is continuous.

10. A coil of the character described, said coil made up of a plurality of pancake-windings connected together to form a continuous coil, flanges or barriers of insulating material between adjacent windings, and all of said windings so connected as to form a continuous coil, a laminated core for said coil, said core comprising two separate members having gaps between the same, and means to adjust the gap.

11. A coil of the character described, said coil having a series of pancake-windings connected together to form a continuous coil, a core for said coil having a gap therein, and means to adjust said gap, and a filling of insulating material between the core and the coil.

12. A coil of the character described, said coil comprising a plurality of twin pancake-windings, the windings of each member of the twin being separated by a barrier, the inner ends of said windings being permanently connected through said barrier near the core, and the outer ends of said members near the periphery being free for connection with adjacent twin windings, the whole forming a continuous winding when said free ends are connected.

DIMMITT ROSS LOVEJOY.

Witnesses:
B. FRANK SORMEK,
H. C. WORKMAN.